United States Patent
Lee et al.

(10) Patent No.: US 12,069,225 B2
(45) Date of Patent: Aug. 20, 2024

(54) DISPLAY DEVICE AND CONTROL METHOD FOR SAME

(71) Applicant: SAMSUNG ELECTRONICS CO., LTD., Suwon-si (KR)

(72) Inventors: Hoyoung Lee, Suwon-si (KR); Taegyu Lim, Gwacheon-si (KR); Chanyul Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 263 days.

(21) Appl. No.: 17/579,272

(22) Filed: Jan. 19, 2022

(65) Prior Publication Data
US 2022/0141443 A1 May 5, 2022

Related U.S. Application Data

(63) Continuation of application No. PCT/KR2020/009440, filed on Jul. 17, 2020.
(Continued)

(30) Foreign Application Priority Data

Feb. 4, 2020 (KR) ........................ 10-2020-0013257

(51) Int. Cl.
*H04N 13/15* (2018.01)
*G09F 9/33* (2006.01)
(Continued)

(52) U.S. Cl.
CPC .............. *H04N 13/15* (2018.05); *G09F 9/33* (2013.01); *H04N 13/324* (2018.05); *H04N 13/327* (2018.05)

(58) Field of Classification Search
CPC .... H04N 13/15; H04N 13/327; H04N 13/324; G09F 9/33
See application file for complete search history.

(56) References Cited

U.S. PATENT DOCUMENTS

| | | | |
|---|---|---|---|
| 7,379,057 B2 | 5/2008 | Kobayashi et al. | |
| 7,999,823 B2 | 8/2011 | Roth et al. | |
| (Continued) | | | |

FOREIGN PATENT DOCUMENTS

| | | |
|---|---|---|
| CN | 106531060 A | 3/2017 |
| CN | 107945236 A | 4/2018 |
| (Continued) | | |

OTHER PUBLICATIONS

International Search Report (PCT/ISA/210) dated Oct. 26, 2020 issued by the International Searching Authority in International Application No. PCT/KR2020/009440.
(Continued)

*Primary Examiner* — Yassin Alata
(74) *Attorney, Agent, or Firm* — Sughrue Mion, PLLC (57) ABSTRACT

Disclosed are a display device and a control method for the display device. The display device according to the disclosure may drive each of a plurality of LEDs included in the display device on the basis of input data including three-dimensional color information to acquire output data including three-dimensional color information about the colors output from the plurality of LEDs, acquire 4D correction coefficients, which are for correcting the colors output from the plurality of LEDs to colors designated to be output by the input data, for each of the plurality of LEDs on the basis of the input data and the output data, and control the plurality of LEDs to output colors included in an image on the basis of the acquired 4D correction coefficients when an input for displaying the image is received.

15 Claims, 7 Drawing Sheets

Related U.S. Application Data (60) Provisional application No. 62/877,447, filed on Jul. 23, 2019.

(51) Int. Cl.
   *H04N 13/324* (2018.01)
   *H04N 13/327* (2018.01)

(56) References Cited

U.S. PATENT DOCUMENTS

| | | |
|---|---|---|
| 8,094,933 B2 | 1/2012 | Cok et al. |
| 8,098,335 B2 | 1/2012 | Kobayashi et al. |
| 8,152,311 B2 | 4/2012 | Cho |
| 9,214,010 B2 | 12/2015 | Kawaguchi |
| 10,147,392 B2 | 12/2018 | Jung et al. |
| 10,629,118 B2 | 4/2020 | Choi et al. |
| 2005/0275640 A1 | 12/2005 | Kobayashi et al. |
| 2008/0246882 A1 | 10/2008 | Kobayashi et al. |
| 2010/0013870 A1 | 1/2010 | Inamura |
| 2018/0047325 A1 | 2/2018 | Biwa et al. |
| 2019/0080970 A1 | 3/2019 | Chaji |
| 2021/0150974 A1 | 5/2021 | Sohn et al. |

FOREIGN PATENT DOCUMENTS

| | | |
|---|---|---|
| CN | 109859702 A | 6/2019 |
| JP | 2000315070 A | 11/2000 |
| JP | 2006128815 A | 5/2006 |
| JP | 2007310008 A | 11/2007 |
| KR | 10-2004-0023567 A | 3/2004 |
| KR | 10-2015-0110507 A | 10/2015 |
| KR | 1020180058048 A | 5/2018 |
| KR | 1020180061450 A | 6/2018 |
| KR | 1020190030826 A | 3/2019 |
| KR | 1020210039822 A | 4/2021 |
| WO | 2014/088975 A1 | 6/2014 |

OTHER PUBLICATIONS

Written Opinion (PCT/ISA/237) dated Oct. 26, 2020 issued by the International Searching Authority in PCT/KR2020/009440.
Communication dated Apr. 25, 2022, issued by the Korean Intellectual Property Office in Korean Patent Application No. 10-2020-0013257.
Communication dated Jul. 14, 2022, issued by the European Patent Office in counterpart European Application No. 20843410.0.

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{43} & h_{42} & h_{43} & h_{44} \end{bmatrix}$$

DISPLAY DEVICE AND CONTROL METHOD FOR SAME

CROSS REFERENCE TO RELATED APPLICATIONS

This application is a by-pass continuation of International Application No. PCT/KR2020/009440 filed Jul. 17, 2020 which claims priority to U.S. Provisional Patent Application No. 62/877,447 filed Jul. 23, 2019 and KR Patent Application No. 10-2020-0013257 filed Feb. 4, 2020, the contents of all of the above are incorporated by reference herein.

TECHNICAL FIELD

This disclosure relates to a display device and a control method for same and, more specifically, to a display device capable of correcting color outputted by a light emitting diode (LED) included in the display device.

BACKGROUND ART

If an LED embedded in a display device is driven based on input data that includes information about absolute colors, the colors displayed on the display of the actual display device may differ from the information about the absolute colors included in the input data. In addition, due to the difference in physical properties between a plurality of LEDs that can inevitably occur in the manufacturing process of multiple LEDs, the colors output by each of the plurality of LEDs may differ from each other even if the same input data is input.

Therefore, it is required technology to calibrate or correct the color output by the LED included in the display device to a color specified to be output by input data, and for example, technology to calibrate the color output by the LED based on three-dimensional correction compensation has been applied.

In the case of the micro LED which has been technically advanced in recent years, since there is a non-linear relationship between the luminance and chromaticity of the color outputted by the LED due to the size of the device and the feature of the manufacturing process, there is a need for a color calibration technology in consideration of a non-linear relationship between luminance and chromaticity.

Since color calibration for a non-linear LED has been developed, it is possible to repeatedly perform calibration in consideration of a non-linear relationship between luminance and chromaticity, or obtain and store all three-dimensional correction coefficients for each luminance level, and thus, there is a problem in terms of storage capacity and processing speed.

DISCLOSURE

Technical Problem

Various embodiments of the disclosure may provide a display device for efficiently and quickly calibrating the color output by the LED based on 4D of correction coefficients and a controlling method thereof.

Technical Solution

According to an embodiment, a display device includes a display comprising a plurality of light emitting diodes (LEDs); a memory storing at least one instruction; and a processor configured to execute the at least one instruction, and the processor, by executing the at least one instruction, may obtain output data comprising three-dimensional (3D) color information for a color outputted by the plurality of LEDs by driving each of the plurality of LEDs based on input data including 3D color information, obtain four-dimensional (4D) color information corresponding to 3D color information included in the input data and 4D color information corresponding to 3D color information included in the output data, obtain 4D correction coefficients, by each of the plurality of LEDs, to calibrate a color outputted by the plurality of LEDs to a color designated to be outputted by the input data, based on input data including the 4D color information and output data including the 4D color information, and based on receiving an input to display an image, control the plurality of LEDs to output the color included in the image based on the obtained 4D correction coefficients.

The processor may obtain the 4D correction coefficients by inputting the input data and the output data to a trained neural network model.

The neural network model may be trained to obtain the 4D correction coefficients based on the input data and the output data obtained by inputting the input data to an external display.

The processor may obtain the 4D color information included in the input data and the 4D color information included in the output data by transforming the 3D color information included in the input data and the 3D color information included in the output data to homogeneous coordinates, respectively.

The display device may further include a communicator including a circuitry, and the output data may be measured by an external measuring device and received from the external device through the communicator.

The processor may, based on receiving an input to display the image, transform the 3D input color information included in the image to obtain the 4D input color information, based on the 4D correction coefficients, transform the 4D input color information to obtain the 4D output color information, normalize the 4D output color information to obtain the 3D output color information to output the image, and control the plurality of LEDs to output the image based on the 3D output color information.

The 4D correction coefficients may include a plurality of elements to transform the 4D input color information to the 4D output color information, and the plurality of elements may include elements associated with rotation, shear, scale, translation, projection, and skew.

The 4D input color information may include the 3D input color information and additional information different from the 3D input color information, and the additional information may include information about temperature of each of the plurality of LED devices.

According to an embodiment, a method of controlling a display device includes obtaining output data comprising three-dimensional (3D) color information for a color outputted by the plurality of LEDs by driving each of the plurality of LEDs based on input data including 3D color information; obtaining four-dimensional (4D) color information corresponding to 3D color information included in the input data and 4D color information corresponding to 3D color information included in the output data; obtaining 4D correction coefficients, by each of the plurality of LEDs, to calibrate a color outputted by the plurality of LEDs to a color designated to be outputted by the input data, based on input data including the 4D color information and output data including the 4D color information; and based on receiving an input to display an image, controlling the plurality of LEDs to output the color included in the image based on the obtained 4D correction coefficients.

The obtaining the 4D correction coefficients may include obtaining the 4D correction coefficients by inputting the input data and the output data to a trained neural network model.

The neural network model may be trained to obtain the 4D correction coefficients based on the input data and the output data obtained by inputting the input data to an external display.

The obtaining the 4D color information may include obtaining the 4D color information included in the input data and the 4D color information included in the output data by transforming the 3D color information included in the input data and the 3D color information included in the output data to homogeneous coordinates, respectively.

The output data may be measured by an external measuring device and received from the external device.

The controlling the plurality of LEDs may include, based on receiving an input to display the image, transforming the 3D input color information included in the image to obtain the 4D input color information, based on the 4D correction coefficients, transforming the 4D input color information to obtain the 4D output color information, normalizing the 4D output color information to obtain the 3D output color information to output the image, and controlling the plurality of LEDs to output the image based on the 3D output color information.

The 4D correction coefficients may include a plurality of elements to transform the 4D input color information to the 4D output color information, and the plurality of elements may include elements associated with rotation, shear, scale, translation, projection, and skew.

The 4D input color information may include the 3D input color information and additional information different from the 3D input color information, and the additional information may include information about temperature of each of the plurality of LED devices.

According to an embodiment, a computer-readable recording medium including a program to execute a method for controlling the display device includes obtaining output data comprising three-dimensional (3D) color information for a color outputted by the plurality of LEDs by driving each of the plurality of LEDs based on input data including 3D color information; obtaining four-dimensional (4D) color information corresponding to 3D color information included in the input data and 4D color information corresponding to 3D color information included in the output data; obtaining 4D correction coefficients, by each of the plurality of LEDs, to calibrate a color outputted by the plurality of LEDs to a color designated to be outputted by the input data, based on input data including the 4D color information and output data including the 4D color information; and based on receiving an input to display an image, controlling the plurality of LEDs to output the color included in the image based on the obtained 4D correction coefficients.

Provided herein is a display device including: a display including a plurality of light emitting diodes (LEDs); a memory storing at least one instruction; and a processor configured to execute the at least one instruction, wherein the processor, by executing the at least one instruction, is configured to: obtain output data including second three-dimensional (3D) color information for a first color outputted by the plurality of LEDs by driving each of the plurality of LEDs based on input data including first 3D color information, obtain first four-dimensional (4D) color information corresponding to the first 3D color information and second 4D color information corresponding to the second 3D color information, obtain 4D correction coefficients, associated with each of the plurality of LEDs, to calibrate second color information to be output by the plurality of LEDs, based on the input data including the first 4D color information and the output data including the second 4D color information, and based on receiving a first input to display an image, control the plurality of LEDs to output the second color information to be output by the plurality of LEDs based on the obtained 4D correction coefficients.

Also provided herein is a method of controlling a display device, the method including: obtaining output data including second three-dimensional (3D) color information for a first color outputted by the plurality of LEDs by driving each of the plurality of LEDs based on input data including the first 3D color information; obtaining first four-dimensional (4D) color information corresponding to the first 3D color information and obtaining second 4D color information corresponding to the second 3D color information; obtaining 4D correction coefficients, associated with each of the plurality of LEDs, to calibrate second color information output by the plurality of LEDs, based on the input data including the first 4D color information and the output data including the second 4D color information; and based on receiving a first input to display an image, controlling the plurality of LEDs to output the second color information to be output by the plurality of LEDs based on the obtained 4D correction coefficients.

A computer-readable recording medium including a program to execute a method for controlling a display device, the method including: obtaining output data including second three-dimensional (3D) color information for a first color outputted by the plurality of LEDs by driving each of the plurality of LEDs based on input data including the first 3D color information; obtaining first four-dimensional (4D) color information corresponding to the first 3D color information and obtaining second 4D color information corresponding to the second 3D color information; obtaining 4D correction coefficients, associated with each of the plurality of LEDs, to calibrate second color information output by the plurality of LEDs, based on the input data including the first 4D color information and the output data including the second 4D color information; and based on receiving a first input to display an image, controlling the plurality of LEDs to output the second color information to be output by the plurality of LEDs based on the obtained 4D correction coefficients.

MODE FOR INVENTION

The disclosure may have various modifications and includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, well-known functions or constructions are not described in detail since they would obscure the disclosure with unnecessary detail.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

Hereinafter, with reference to the attached drawings, embodiments will be described in detail so that those skilled in the art to which the disclosure belongs to can easily make and use the embodiments.

Figure 1:
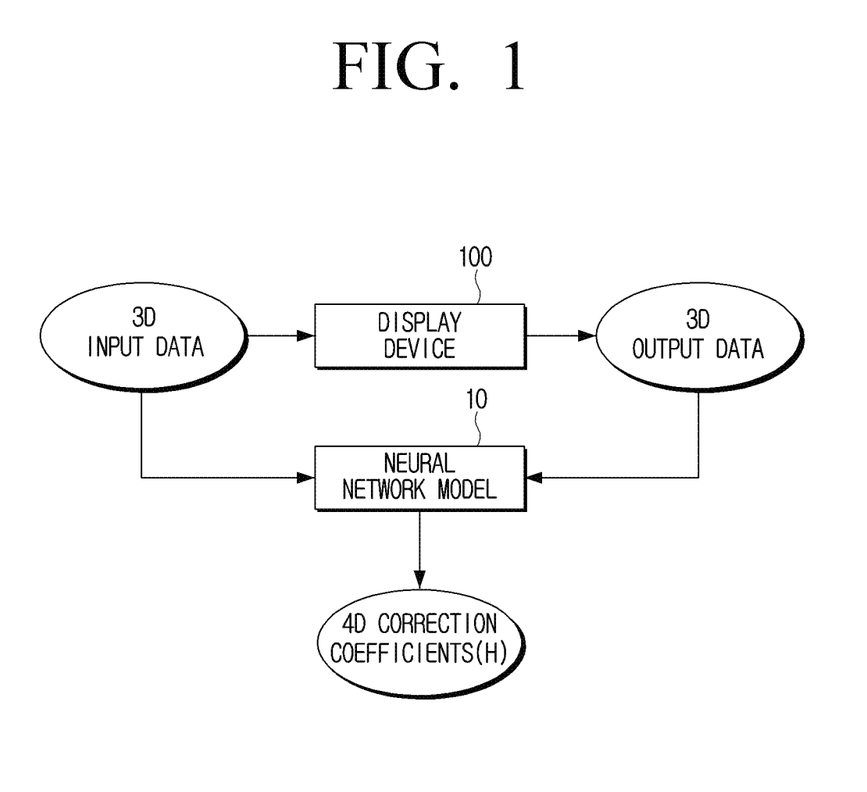
FIG. 1 is a concept diagram schematically illustrating a process of controlling a display device according to an embodiment of the disclosure.

FIG. 1 is a concept diagram schematically illustrating a process of controlling a display device 100 according to an embodiment of the disclosure.

As illustrated in FIG. 1, the display device 100 according to the disclosure may obtain output data based on the input data.

The input data refers to data including information about the absolute color for driving the LED. Specifically, the input data may include 3D color information, especially 3D color information corresponding to the coordinate values of a red, green, blue (RGB) color space. For example, the input data may include the RGB value composed of a combination of (80, 188, 223).

The output data is data corresponding to the input data, and refers to data including information on the color output through the LED as a result of driving the LED based on the input data. The output data includes 3D color information similar to the input data, and in particular, may include 3D color information corresponding to the coordinate value of the RGB color space.

The output data may be obtained by driving a plurality of LEDs included in the display device 100 based on the input data, and measuring a color output by the plurality of LEDs included in the display device 100 by an external measuring device. When output data is obtained by the external device, the display device 100 may receive and obtain output data from the external device.

The external measuring device may be implemented as at least one of a spectral photometer and a photoelectric colorimeter. The spectral photometer may use a prism or diffraction grating or spectral filter to separate light coming from a sample into wavelength components and detect the intensity of each fundamental wavelength elements to measure chromaticity and luminance, and may obtain output data according to the disclosure based on the measured chromaticity and luminance. The photoelectric colorimeter includes an optical filter adjacent to a tristimulus value, and detects the intensity of light passing through the optical filter, thereby measuring the chromaticity and luminance outputted by the plurality of LEDs, and may obtain output data according to the disclosure.

When the plurality of LEDs included in the display device 100 are driven based on the input data as described above, the color displayed on the display of the display device 100 may be different from the information on the absolute color included in the input data. In other words, the output data for the color output by the plurality of LEDs may be different from the color designated to be output by the input data.

For example, if the RGB value included in the input data is (80, 188, 223), the RGB value included in the output data may be (88, 183, 220). Due to the difference in physical properties between the plurality of LEDs that may inevitably occur in the manufacturing process of the plurality of LEDs, the output data for the color output by each of the plurality of LEDs may be different even if the same input data is input.

There is a need for a technology for calibrating or correcting the color outputted by the plurality of LEDs included in the display device 100 to a designated color to be output by the input data. In particular, since there is a non-linear relationship between the luminance and chromaticity of the color outputted by the LED in the case of a micro LED, a color correction technique considering a non-linear relationship between luminance and chromaticity is required.

According to the disclosure, the display device 100 may obtain four-dimensional (4D) correction coefficients for correcting the color outputted by the plurality of LEDs to the color designated to be output by the input data, based on the input data and the output data, for each of the plurality of LED pixels. The obtaining 4D correction coefficients for each of the plurality of LEDs is due to a difference in physical properties between the plurality of LEDs as described above.

As illustrated in FIG. 1, the display device 100 may input data and output data into a trained neural network model 10 to obtain 4D correction coefficients. The trained neural network model 10 may be a neural network model 10 trained to output 4D correction coefficients on the basis of the input data and output data obtained by inputting the input data to the display device 100 or an external display 200. According to the disclosure, the neural network model 10 refers to an artificial intelligence model that includes a neural network, and thus the term neural network model may be replaced by a term, an artificial intelligence (AI) model.

The neural network model 10 may be trained through a process of adjusting 4D correction coefficients so that color information included in the output data and color information designated to be output by the input data may be mapped. The neural network model 10 may be trained through a process of backpropagating an error between color information designated to be output by the input data and color information on a color output according to the actual input data, and adjusting a weight included in the neural network model 10.

The input data used for learning of the neural network model 10 preferably includes all color information which 3D color information may represent. For example, the input data used for learning of the neural network model 10 preferably includes 256×256×256 RGB values corresponding to all coordinate values of the RGB color space. Furthermore, it is preferable that the learning of the neural network model 10 is performed through a process of driving a larger number of LEDs.

When learning of the neural network model 10 is performed based on a large amount of input data as described above, the process of obtaining the 4D correction coefficients according to the disclosure on the basis of the trained neural network model 10 may be performed with only a relatively small amount of input data, for example, an RGB vale in which only a part of the coordinate values of the RGB color space is sampled.

Although the process of obtaining 4D correction coefficients according to the disclosure through the neural network model 10 is described above, the disclosure is not limited thereto. The 4D correction coefficients according to the disclosure may be obtained through a known algorithm such as a singular vector decomposition (SVD) algorithm or a combination of known algorithms.

When the 4D correction coefficients are obtained, the display device 100 may control a plurality of LEDs to output the colors included in the image based on the obtained 4D correction coefficients. The display device 100 may convert the input 3D color information included in the image to obtain 4D input color information, based on 4D correction coefficients, transform 4D input color information to obtain the 4D output color information, normalize the 4D output color information to obtain 3D output color information for outputting the image, and control a plurality of LEDs to output the image based on the 3D output color information.

Based on the 4D correction coefficients, the process of calibrating the color output by a plurality of LEDs to the specified color to be output by input data is described in detail, with reference to FIGS. 2A to 4.

Figure 2A:
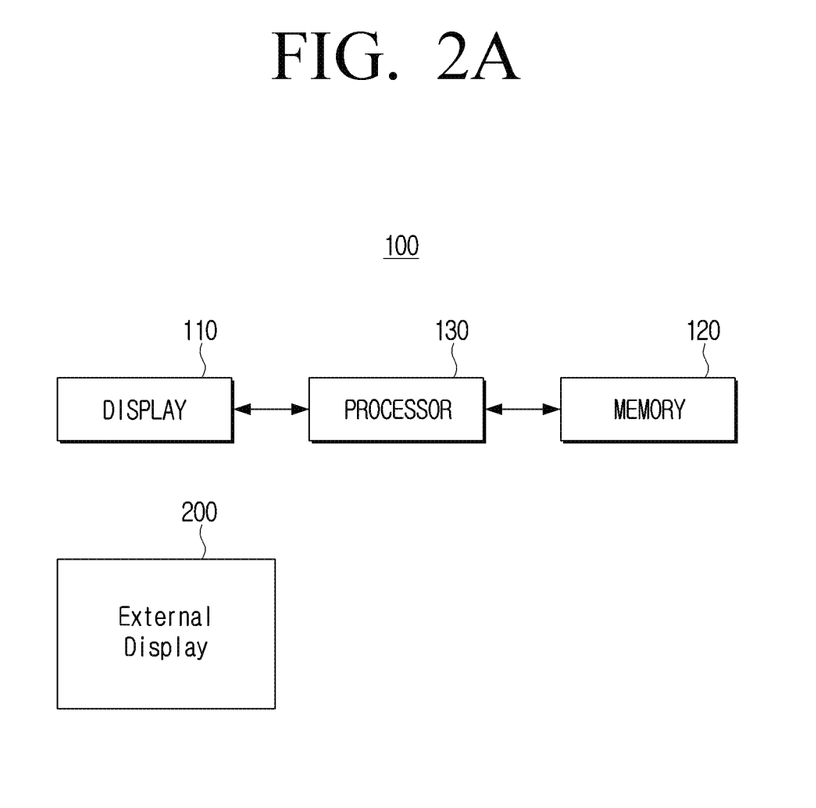
FIG. 2A is a block diagram schematically illustrating a configuration of a display device according to an embodiment of the disclosure.
Figure 2B:
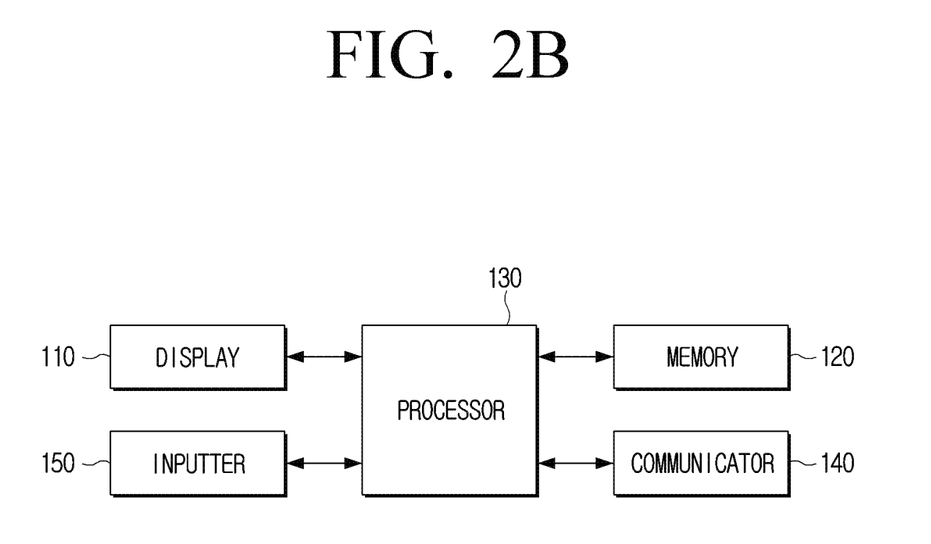
FIG. 2B is a block diagram illustrating a configuration of a display device in detail according to an embodiment of the disclosure.

FIG. 2A is a block diagram schematically illustrating a configuration of the display device 100 according to an embodiment of the disclosure; and FIG. 2B is a block diagram illustrating a configuration of the display device 100 in detail according to an embodiment of the disclosure.

FIG. 2A illustrates the display device 100 and the external display 200. As shown in FIG. 2A, the display device 100 according to the disclosure may include the display 110, the memory 120, and the processor 130, and as illustrated in FIG. 2B, may further include the communicator 140 and the inputter 150, or the like. This is exemplary, and a new configuration may be added in addition to this configuration, and some configurations may be omitted.

The display 110 may output an image by the control of the processor 130. The display 110 may display an image on the display 110 based on image data stored in the memory 120 by the control of the processor 130. The display 110 according to an embodiment may include a plurality of LEDs. The display 110 may display an image on the display 110 as the processor 130 controls a plurality of LEDs.

At least one instruction regarding the display device 100 may be stored in the memory 120. In addition, an operating system (O/S) for driving the display device 100 may be stored in the memory 120. The memory 120 may store various software programs or applications for operating the display device 100 according to various embodiments. The memory 120 may include a semiconductor memory such as a flash memory, a magnetic storage medium such as a hard disk, or the like.

Specifically, the memory 120 may store various software modules for operating the display device 100, and the processor 130 (e.g., at least one processor) may control the operation of the display device 100 by executing various software modules that are stored in the memory 120. That is, the memory 120 may be accessed by the processor 130, and may perform reading, recording, modifying, deleting, updating, or the like, of data by the processor 130.

It is understood that the term memory 120 may be used to refer to any volatile or non-volatile memory, an ROM, RAM proximate to or in the processor 130 or a memory card (for example, a micro SD card, a memory stick) mounted to the display device 100.

According to various embodiments, the memory 120 may store various information and data such as input data, output data, data for a neural network model, 4D correction coefficients, 3D input color information, 3D output color information, 4D input color information, 4D output color information, or the like. In addition, various information required within a range to achieve the objective of the disclosure may be stored in the memory 120, and the information stored in the memory 120 may be received from a server or an external device, or may be updated as the information is input by the user.

The processor 130 controls overall operations of the display device 100. Specifically, the processor 130 is connected to a configuration of the display device 100 including the display 110, the communicator 140, an inputter 150, a memory 120, or the like, and controls overall operations of the display device 100 by executing at least one instruction stored in the memory 120 as described above.

The processor 130 may be implemented in various ways. For example, the processor 130 may be implemented as at least one of an application specific integrated circuit (ASIC), an embedded processor, a microprocessor, a hardware control logic, a hardware finite state machine (FSM), a digital signal processor (DSP), or the like. Further, processor 130 may include at least one of a central processing unit (CPU), a graphic processing unit (GPU), a main processing unit (MPU), or the like.

According to various embodiments, the processor 130 may control the process of obtaining the 4D correction coefficients, the process of calibrating the color outputted by a plurality of LEDs to a color designated to be outputted by the input data based on the 4D correction coefficients, or the like, and this will be described subsequent to the description of the communicator 140 and the inputter 150.

The communicator 140 includes a circuit and may perform communication with an external device. Specifically, the processor 130 may receive various data or information from an external device connected through the communicator 140, and may transmit various data or information to an external device. The communicator 140 may include at least one of a Wi-Fi module, Bluetooth module, wireless communication module, and NFC module, and may perform communication with an external device based on the communication method according to each module.

In particular, in various embodiments according to the disclosure, the communicator 140 may receive data for a neural network model trained through the external display 200. The communicator 140 may receive the output data measured from the external measuring device.

The inputter 150 includes a circuit, and the processor 130 may receive a user command for controlling the operation of the display device 100 through the inputter 150. The inputter 150 may include a microphone, a camera, and a remote control signal receiver. The inputter 150 may be implemented in a form included in the display 110 as a touch screen. In particular, in various embodiments according to the disclosure, the inputter 150 may receive a user command for displaying an image.

The control process of the processor 130 according to various embodiments of the disclosure will be described below. Since the meaning of the input data and the output data according to the disclosure has been described above with reference to FIG. 1, a detailed description of the input data and the output data will be omitted, unless the description is to more clearly describe the disclosure.

The processor 130 may obtain output data based on input data. Specifically, the output data may be obtained by driving a plurality of LEDs included in the display device 100 based on input data, and measuring the color output by a plurality of LEDs included in the display device 100 by an external measuring device. When the output data is obtained by an external device, the display device 100 may receive and obtain the output data from the external device through the communicator 140.

When the input data and the output data are obtained, the processor 130 may obtain 4D color information corresponding to the 3D color information included in each of the input data and the output data. The processor 130 may obtain 4D color information corresponding to the 3D color information included in the input data and 4D color information corresponding to the 3D color information included in the output data.

The processor 130 may transform 3D color information included in the input data and 3D color information included in the output data into a homogeneous coordinate, and obtain 4D color information included in the input data and 4D color information included in the output data.

When the 4D color information included in the input data and the 4D color information included in the output data are obtained, the processor 130 may input the input data and the output data into a trained neural network model to obtain 4D correction coefficients. The processor 130 may obtain 4D correction coefficients for correcting the color output by the plurality of LEDs to the color designated to be output by the input data, on the basis of output data including 4D color information and input data including 4D color information.

The trained neural network model may be a pre-trained neural network model to output 4D correction coefficients based on the input data or the output data obtained by inputting the input data to the display device 100 or the external display 200.

The neural network model may be trained through a process of calibrating 4D correction coefficients so that color information included in the output data and color information designated to be output by the input data may be mapped. More specifically, the neural network model may be trained through a process of backpropagation of an error between color information designated to be output by input data and color information on a color output according to actual input data, and calibrating a weight included in the neural network model.

The input data used for learning of the neural network model preferably includes all color information capable of expressing three-dimensional color information. For example, the input data used for learning of the neural network model preferably includes 256×256×256 RGB values corresponding to all coordinate values of the RGB color space. It is preferable that the learning of the neural network model is performed through a process of driving a larger number of LEDs.

When learning of the neural network model is performed based on a large amount of input data as described above, the process of obtaining the 4D correction coefficients according to the disclosure on the basis of the trained neural network model may be performed with only a relatively small amount of input data, for example, only one of the coordinate values of the RGB color space. This will be described in more detail with reference to FIGS. 5A through 5C.

It has been described a process of obtaining the 4D correction coefficients through a neural network model, but the disclosure is not limited thereto. The 4D correction coefficients may be obtained through known algorithm such as singular vector decomposition (SVD) algorithm, or the combination of known algorithms.

Hereinafter, before describing a process of calibrating a color outputted by a plurality of LEDs based on the 4D correction coefficients to a color designated to be outputted by the input data, 4D correction coefficients and a plurality of elements included in the 4D correction coefficients will be further described with reference to FIG. 3.

Figure 3:
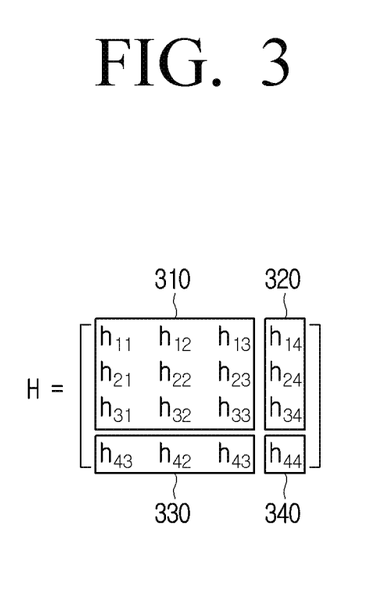
FIG. 3 is a diagram illustrating four-dimensional (4D) correction coefficients and a plurality of elements included in the 4D correction coefficients according to an embodiment of the disclosure.

As shown in FIG. 3, the 4D correction coefficients according to the disclosure may be represented by a 4D matrix including a plurality of elements. For example, 4D correction coefficients may be represented by a matrix of 4×4, including 16 elements, as shown in FIG. 3.

The plurality of elements may include a first element 310 associated with rotation, share, and scale, a second element 320 for translation, a third element 330 associated with a projection, and a fourth element 340 associated with skew. The plurality of elements may map information on a 3D input color into a 4D space through rotation transformation, shear transformation, scale transformation, and translation with respect to three-dimensional input color information, and then project the same back to a 3D space.

While FIG. 3 shows a 4×4 matrix as an example of 4D correction coefficients, according to another embodiment of the disclosure, 4D correction coefficients may be represented by a matrix of 4×n. The 4D correction coefficients may further include various elements in addition to a plurality of elements as shown in FIG. 3, in consideration of an increase in the number of bits for each pixel of an image, an increase in the number of information including input color information, and an increase in nonlinearity between luminance and chromaticity of an LED device, or the like.

Hereinafter, a process of calibrating color outputted by a plurality of LEDs to a color designated to be outputted by the input data based on the 4D correction coefficients will be described in detail.

When an input for displaying an image is received, the processor 130 may transform the 3D input color information included in the image to obtain 4D input color information. The processor 130 may convert 3D input color information into a homogeneous coordinate so as to perform an operation with 4D correction coefficients, thereby obtaining 4D input color information.

For example, when the 3D input color information is represented by a 3×1 matrix of $[R, G, B]^T$ (where the superscript T denotes a transposed matrix), the 4D input color information may be represented by a 4×1 matrix such as $[R, G, B, W]^T$. The 4D input color information may include 3D input color information (R, G, B) and additional information (W) different from the 3D input color information. In particular, the additional information W may be 1, which indicates that $[R, G, B, W]^T$ means a point in the RGB color space, unlike an example in which when the additional information W is 0, $[R, G, B, W]^T$ means a vector in the RGB color space.

The additional information W may include information on the temperature of each of the plurality of LED devices. When the additional information W includes information on the temperature of each of the plurality of LED devices, 4D correction coefficients may be obtained by inputting 4D input color information including information about temperature of each of the plurality of LED devices and inputting 4D output color information corresponding to the 4D input color information to a neural network model. In this example, the 4D correction coefficients are correction coefficients for correcting the color outputted by the plurality of LEDs to a color designated to be outputted by the input data in consideration of the information on the temperature of each of the plurality of LED devices.

When the 4D input color information is obtained, the processor 130 may convert the 4D input color information based on the 4D correction coefficients to obtain 4D output color information. Specifically, when the 4D input color information is $[R, G, B, W]^T$ and the 4D correction coefficients are 4×4 matrices, the processor 130 may perform a matrix multiplication operation between 4D input color information and 4D correction coefficients to obtain a 4×1 matrix such as $[R', G', B', W']^T$ as 4D output color information.

When the 4D output color information is obtained, the processor 130 may normalize the 4D output color information to obtain 3D output color information for outputting the image. For example, if W and W' are 1, if a matrix such as $[R', G', B', W']^T$ is obtained as 4D output color information, the processor 130 may normalize the 4D output color information to obtain a matrix such as $[R', G', B']^T$ as 3D output color information.

When 3D output color information is obtained through the above-described process, the processor 130 may output an image based on the obtained 3D output color information. Accordingly, the processor 130 may calibrate the color outputted by the plurality of LEDs on the basis of the 4D correction coefficients, and output the calibrated color.

According to various embodiments of the disclosure, a display device capable of calibrating a color outputted by an LED efficiently and rapidly based on the 4D correction coefficients is provided.

Figure 4:
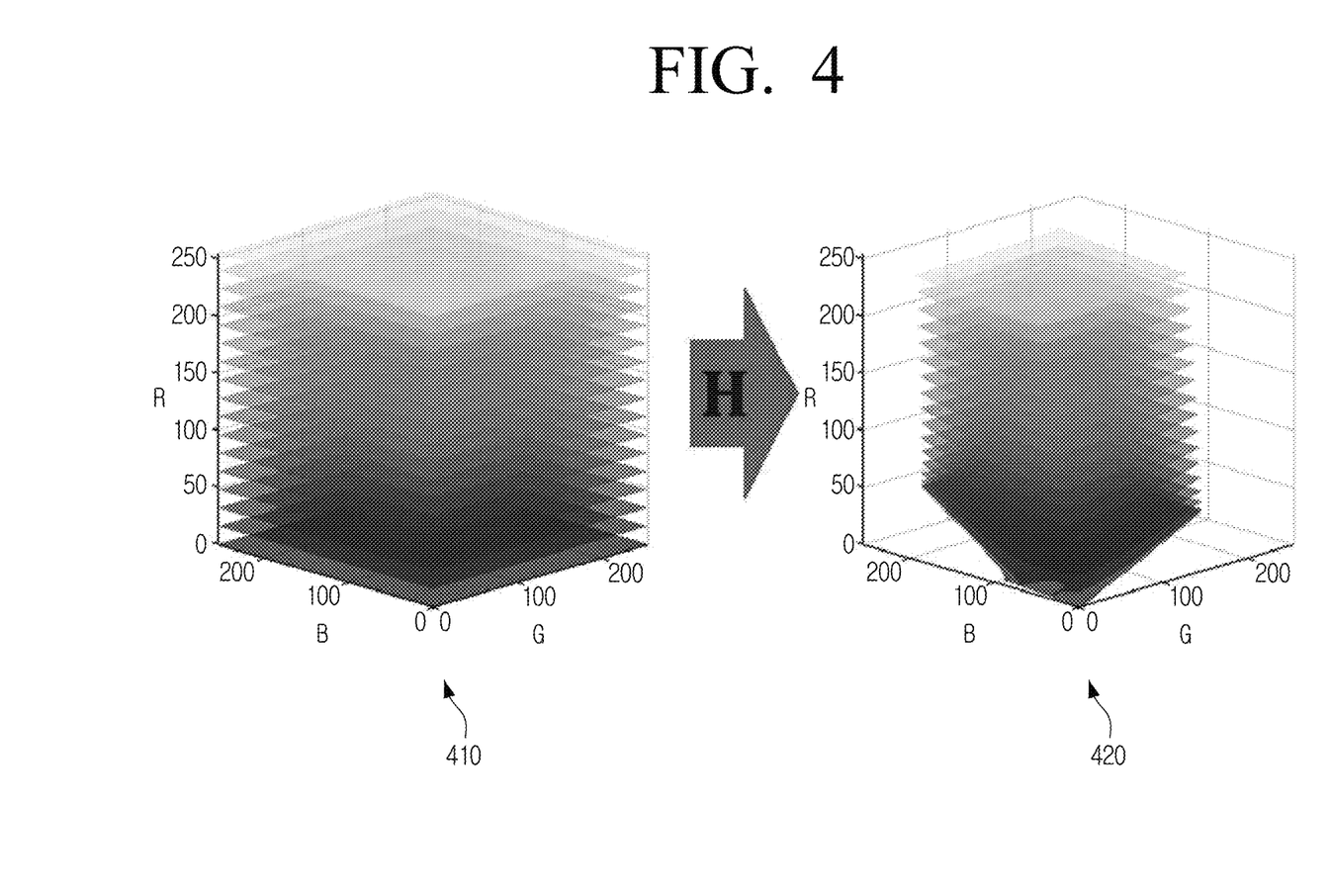
FIG. 4 is a graph illustrating input data and calibrated data based on the 4D correction coefficients on a 3D color space according to an embodiment of the disclosure.
Figure 5:
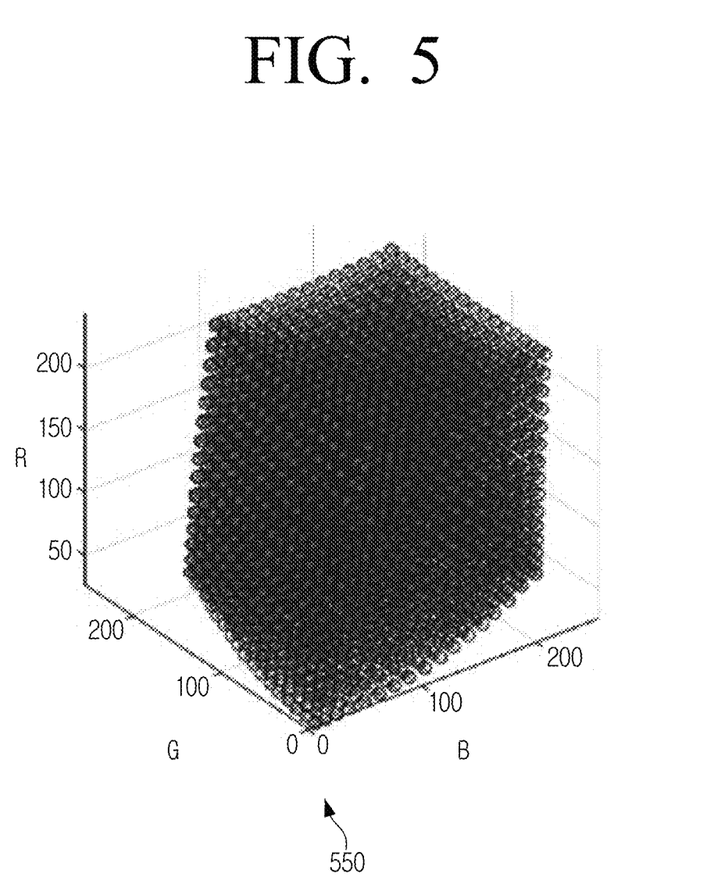
FIG. 5 is a graph illustrating accuracy of input data calibrated based on the 4D correction coefficients according to an embodiment of the disclosure.

FIG. 4 is a graph illustrating input data and calibrated data based on the 4D correction coefficients on a 3D color space according to an embodiment of the disclosure and FIG. 5 is a graph illustrating accuracy of input data calibrated based on the 4D correction coefficients according to an embodiment of the disclosure.

A left graph 410 of FIG. 4 is a graph illustrating 3D color information included in the input data before correction. The left graph 410 is a graph showing information on an absolute color for driving the LED as a coordinate value of the RGB color space.

A right graph 420 of FIG. 4 is a graph illustrating input data corrected based on 4D correction coefficients according to an embodiment of the disclosure. As shown in the right graph 430, in the case of corrected input data according to an embodiment of the disclosure, a shear difference between each layer corresponding to a plurality of gray levels is not large, and a uniformity is provided in the entire color space.

In the graph 550 of FIG. 5, the points represented by x are obtained by obtaining 16 3D correction coefficients for each of the plurality of luminance stages, and correcting the input data on the basis of the obtained 16 3D correction coefficients. The points represented by o in the graph 550 of FIG. 5 represent the result of correcting the input data on the basis of the 4D coefficients according to the disclosure. As illustrated in FIG. 5, it is seen that the results of both parties are nearly identical. In particular, as a result of performing an experiment using 4335 sampled coordinate values among all coordinate values of the RGB color space as input data, the error of both parties was found to be about 0.91%.

Figure 6:
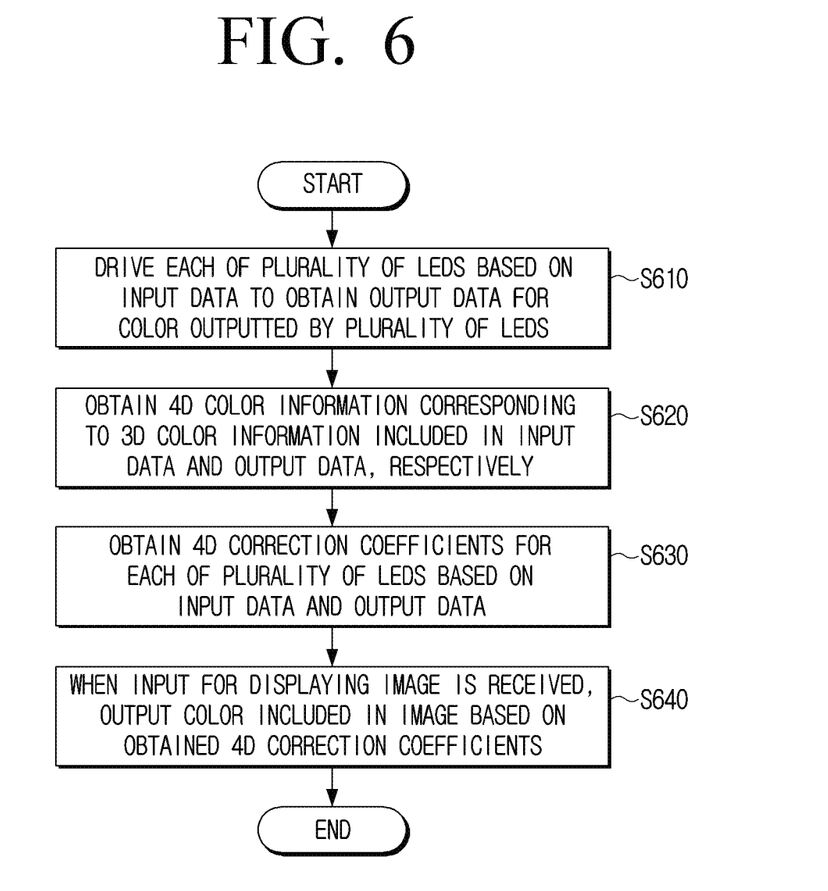
FIG. 6 is a flowchart illustrating a method for controlling a display device according to an embodiment of the disclosure.

FIG. 6 is a flowchart illustrating a method for controlling the display device 100 according to an embodiment of the disclosure.

As illustrated in FIG. 6, the display device 100 according to an embodiment may drive each of the plurality of LEDs based on the input data to obtain output data for a color outputted by the plurality of LEDs in operation S610.

Here, the input data refers to data including information on an absolute color for driving the LED, and the output data refers to data corresponding to the input data, and the data including information on the color outputted through the LED as a result of driving the LED based on the input data is as described above.

The output data may be obtained by driving a plurality of LEDs included in the display device 100 based on the input data, and measuring a color output by the plurality of LEDs included in the display device 100 by an external measuring device. When output data is obtained by the external device, the display device 100 may receive and obtain output data from an external device.

The display device 100 may obtain 4D color information corresponding to 3D color information included in each of the input data and the output data in operation S620. The display device 100 may obtain 4D color information corresponding to 3D color information included in the input data and 4D color information corresponding to 3D color information included in the output data.

The display device 100 may obtain the 4D color information comprises obtaining the 4D color information included in the input data and the 4D color information included in the output data by transforming the 3D color information included in the input data and the 3D color information included in the output data to homogeneous coordinates, respectively.

The display device 100 may obtain the 4D correction coefficients for each of a plurality of LEDs based on the input data and the output data in operation S630. The display device 100 may obtain 4D correction coefficients, by each of the plurality of LEDs, to calibrate a color outputted by the plurality of LEDs to a color designated to be outputted by the input data, based on input data including the 4D color information and output data including the 4D color information.

The display device 100 may input the input data and the output data into a trained neural network model to obtain 4D correction coefficients. The trained neural network model may be a neural network model trained to output 4D correction coefficients on the basis of the input data and output data obtained by inputting the input data to the display device 100 or the external display 200.

When an input for displaying an image is received, the display device 100 may output a color included in the image based on the obtained 4D correction coefficients in operation S640. When 4D correction coefficients are obtained as described above, the display device 100 may control the plurality of LEDs to output a color included in the image based on the obtained 4D correction coefficients.

The display device 100 may transform the 3D input color information included in the image to obtain the 4D input color information, based on the 4D correction coefficients, transform the 4D input color information to obtain the 4D output color information, normalize the 4D output color information to obtain the 3D output color information to output the image, and control the plurality of LEDs to output the image based on the 3D output color information.

The 4D correction coefficients may be represented as a 4×4 matrix including a plurality of elements related to rotation, shear, scale, translation, projection, and skew. The embodiment is not limited thereto and the 4D correction coefficients may include 4×n elements.

The 4D input color information may include the 3D input color information and additional information different from the 3D input color information, and the additional information may include information about temperature of each of the plurality of LED devices.

The control method of the display device 100 may be implemented as a program and provided to the display device 100. Specifically, programs including the control method of the display device 100 may be stored in a non-transitory computer readable medium.

A computer-readable recording medium including a program to execute a method for controlling the display device 100 includes obtaining output data comprising three-dimensional (3D) color information for a color outputted by the plurality of LEDs by driving each of the plurality of LEDs based on input data including 3D color information; obtaining four-dimensional (4D) color information corresponding to 3D color information included in the input data and 4D color information corresponding to 3D color information included in the output data; obtaining 4D correction coefficients, by each of the plurality of LEDs, to calibrate a color outputted by the plurality of LEDs to a color designated to be outputted by the input data, based on input data including the 4D color information and output data including the 4D color information; and based on receiving an input to display an image, controlling the plurality of LEDs to output the color included in the image based on the obtained 4D correction coefficients.

The non-transitory computer-readable medium does not refer to a medium that stores data for a short period of time, such as a register, cache, memory, etc., but semi-permanently stores data and is available of reading by the device. Specifically, various applications or programs may be stored in a non-transitory computer readable medium such as a CD, a DVD, a hard disk, a Blu-ray disk, universal serial bus (USB), a memory card, ROM, or the like, and may be provided.

Although the embodiment has been described in detail with respect to a computer-readable recording medium including a control method of the display device 100 and a program for executing the control method of the display device 100, various embodiments of the display device 100 may be applied to a computer-readable recording medium including a method for controlling the display device 100, and a program for executing the method for controlling the display device 100.

According to various embodiments of the disclosure as described above, it is possible to provide a display device capable of efficiently and quickly correcting a color output by an LED based on 4D correction coefficients.

By obtaining 4D correction coefficients corresponding to all gray levels by LEDs included in the display device and calibrating a color outputted by the LED based on the obtained 4D correction coefficients, the embodiment may achieve significantly high processing speed and reduction of memory capacity as compared to the related art which needs to repeat calibration several times in consideration of the non-linear relationship between luminance and chromaticity or obtain all the 3D correction coefficients by luminance levels and store the same.

Further, in the case of a display device currently being manufactured which has high density and high degree of integration and in the case of a display device implemented to represent a sub-pixel constituting a pixel of a display panel, the effect according to the disclosure may be further maximized.

A function associated with AI may be performed through the memory 120 and the processor 130.

The processor 130 may include one or a plurality of processors. The one or a plurality of processors 130 may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors 130 control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Meanwhile, various embodiments of the disclosure may be implemented in software, including instructions stored on machine-readable storage media readable by a machine (e.g., a computer). An apparatus may call instructions from the storage medium, and execute the called instruction, including an electronic apparatus (for example, electronic device 100) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been illustrated and described with reference to various example embodiments, it will be understood that the various example embodiments are intended to be illustrative, not limiting. One of ordinary skill in the art will understand that various changes in form and details may be made without departing from the spirit and scope of the disclosure, including the appended claims and their equivalents.

What is claimed is:

1. A display device comprising:
a display comprising a plurality of light emitting diodes (LEDs);
a memory storing at least one instruction; and
a processor configured to execute the at least one instruction,
wherein the processor, by executing the at least one instruction, is configured to:
obtain output data comprising second three-dimensional (3D) color information for a first color outputted by the plurality of LEDs by driving each of the plurality of LEDs based on input data including first 3D color information,
obtain first four-dimensional (4D) color information corresponding to the first 3D color information and second 4D color information corresponding to the second 3D color information,
obtain 4D correction coefficients, associated with each of the plurality of LEDs, to calibrate second color information to be output by the plurality of LEDs, based on the input data including the first 4D color information and the output data including the second 4D color information, and
based on receiving a first input to display an image, control the plurality of LEDs to output the second color information to be output by the plurality of LEDs based on the obtained 4D correction coefficients.

2. The display device of claim 1, wherein the processor is configured to obtain the 4D correction coefficients by inputting the input data and the output data to a trained neural network model.

3. The display device of claim 2, wherein the trained neural network model is trained to obtain the 4D correction coefficients based on the input data and the output data obtained by inputting the input data to an external display.

4. The display device of claim 1, wherein the processor is configured to obtain the first 4D color information and the second 4D color information by transforming the first 3D color information and transforming the second 3D color information to homogeneous coordinates, respectively.

5. The display device of claim 1, further comprising:
a communicator including a circuitry,
wherein the output data is measured by an external measuring device and received from the external measuring device through the communicator.

6. The display device of claim 1, wherein the processor is configured to:
based on receiving the first input to display the image, transform the first 3D color information included in the image to obtain the first 4D color information,
based on the 4D correction coefficients, transform the first 4D color information to obtain the second 4D color information,
normalize the second 4D color information to obtain the second color information to be output by the plurality of LEDs, and
control the plurality of LEDs to output the image based on the second color information.

7. The display device of claim 6, wherein the 4D correction coefficients include a plurality of elements to transform the first 4D color information to the second 4D color information, and
wherein the plurality of elements include elements associated with rotation, shear, scale, translation, projection, and skew.

8. The display device of claim 7, wherein the first 4D color information includes the first 3D color information and additional information different from the first 3D color information, and
wherein the additional information includes information about a temperature of each of the plurality of LEDs.

9. A method of controlling a display device, the method comprising:
obtaining output data comprising second three-dimensional (3D) color information for a first color outputted by the plurality of LEDs by driving each of the plurality of LEDs based on input data including the first 3D color information;
obtaining first four-dimensional (4D) color information corresponding to the first 3D color information and obtaining second 4D color information corresponding to the second 3D color information;

obtaining 4D correction coefficients, associated with each of the plurality of LEDs, to calibrate second color information output by the plurality of LEDs, based on the input data including the first 4D color information and the output data including the second 4D color information; and based on receiving a first input to display an image, controlling the plurality of LEDs to output the second color information to be output by the plurality of LEDs based on the obtained 4D correction coefficients.

10. The method of claim 9, wherein the obtaining the 4D correction coefficients comprises obtaining the 4D correction coefficients by inputting the input data and the output data to a trained neural network model.

11. The method of claim 10, wherein the trained neural network model is trained to obtain the 4D correction coefficients based on the input data and the output data obtained by inputting the input data to an external display.

12. The method of claim 9, wherein the obtaining the first 4D color information comprises obtaining the first 4D color information included in the input data and wherein the obtaining the second 4D color information included in the output data comprises transforming the first 3D color information and the second 3D color information to homogeneous coordinates, respectively.

13. The method of claim 9, wherein the output data is measured by an external measuring device and received from the external measuring device.

14. The method of claim 9, wherein the controlling the plurality of LEDs comprises:

based on receiving the first input to display the image, transforming the first 3D color information included in the image to obtain the first 4D color information;

based on the 4D correction coefficients, transforming the first 4D color information to obtain the second 4D output color information;

normalizing the second 4D output color information to obtain the second color information to output the image; and controlling the plurality of LEDs to output the image based on the second color information.

15. A non-transitory computer-readable medium including a program to execute a method for controlling a display device, the method comprising:

obtaining output data comprising second three-dimensional (3D) color information for a first color outputted by the plurality of LEDs by driving each of the plurality of LEDs based on input data including the first 3D color information;

obtaining first four-dimensional (4D) color information corresponding to the first 3D color information and obtaining second 4D color information corresponding to the second 3D color information;

obtaining 4D correction coefficients, associated with each of the plurality of LEDs, to calibrate second color information output by the plurality of LEDs, based on the input data including the first 4D color information and the output data including the second 4D color information; and based on receiving a first input to display an image, controlling the plurality of LEDs to output the second color information to be output by the plurality of LEDs based on the obtained 4D correction coefficients.

\* \* \* \* \*